United States Patent
Coughlan et al.

(10) Patent No.: US 7,564,476 B1
(45) Date of Patent: Jul. 21, 2009

(54) PREVENT VIDEO CALLS BASED ON APPEARANCE

(75) Inventors: Marc William Joseph Coughlan, Rozelle (AU); Alexander Quentin Forbes, Westleigh (AU); Peter D. Runcie, Bilgola Plateau (AU); Alexander Martin Scholte, Phegans Bay (AU); Ralph Warta, Lane Cove (AU)

(73) Assignee: Avaya Inc., Basking Ridge, NJ (US)

( * ) Notice: Subject to any disclaimer, the term of this patent is extended or adjusted under 35 U.S.C. 154(b) by 612 days.

(21) Appl. No.: 11/129,124

(22) Filed: May 13, 2005

(51) Int. Cl.
H04N 7/14 (2006.01)

(52) U.S. Cl. ............. 348/14.08; 348/14.01; 348/14.12

(58) Field of Classification Search ... 348/14.04–14.16; 382/254, 173, 284, 232, 302
See application file for complete search history.

(56) References Cited

U.S. PATENT DOCUMENTS

| | | | |
|---|---|---|---|
| 4,791,660 A | 12/1988 | Oye et al. |
| 5,164,992 A | 11/1992 | Turk et al. |
| 5,206,903 A | 4/1993 | Kohler et al. |
| 5,280,561 A | 1/1994 | Satoh et al. |
| 5,349,379 A | 9/1994 | Eichenlaub |
| 5,430,473 A | 7/1995 | Beecher, II et al. |
| 5,506,872 A | 4/1996 | Mohler |
| 5,619,254 A | 4/1997 | McNelley |
| 5,675,376 A | 10/1997 | Andersson et al. |
| 5,731,805 A | 3/1998 | Tognazzini et al. |
| 5,828,747 A | 10/1998 | Fisher et al. |
| RE36,041 E | 1/1999 | Turk et al. |
| 5,905,525 A | 5/1999 | Ishibashi et al. |
| 5,905,793 A | 5/1999 | Flockhart et al. |
| 5,982,873 A | 11/1999 | Flockhart et al. |
| 5,986,703 A | 11/1999 | O'Mahony |
| 6,046,767 A | 4/2000 | Smith |
| 6,163,607 A | 12/2000 | Bogart et al. |
| 6,173,053 B1 | 1/2001 | Bogart et al. |
| 6,192,122 B1 | 2/2001 | Flockhart et al. |
| 6,343,141 B1 | 1/2002 | Okada et al. |

(Continued)

FOREIGN PATENT DOCUMENTS

EP 0 118 182 9/1985

(Continued)

OTHER PUBLICATIONS

Jang et al.; Portable Communication Terminal Capable of Abstracting And Inserting Background Image and Method Thereof; Oct. 24, 2002; WO02/085018.*

(Continued)

*Primary Examiner*—Melur Ramakrishnaiah
(74) *Attorney, Agent, or Firm*—Sheridan Ross P.C.

(57) ABSTRACT

A video teleconferencing system is provided that (i) determines whether an image frame of a first participant is appropriate for a second participant to the video call and (ii), when the image frame is not appropriate for the video call, alters the image frame to be appropriate for the second participant; before transmission of the image frame to the second participant, notifies the first participant that the image frame is not appropriate; refocuses a camera receiving an image of the first participant so that the image frame becomes appropriate for the second participant; and/or blocks transmission of the at least one image frame to the second participant.

29 Claims, 4 Drawing Sheets

U.S. PATENT DOCUMENTS

| | | | |
|---|---|---|---|
| 6,463,220 | B1 | 10/2002 | Dance et al. |
| 6,483,531 | B1* | 11/2002 | Ryu .................. 348/14.01 |
| 6,496,217 | B1 | 12/2002 | Piotrowski |
| 6,498,684 | B1 | 12/2002 | Gladnick et al. |
| 6,507,356 | B1 | 1/2003 | Jackel et al. |
| 6,556,196 | B1 | 4/2003 | Blanz et al. |
| 6,593,955 | B1 | 7/2003 | Falcon |
| 6,597,736 | B1 | 7/2003 | Fadel |
| 6,603,491 | B2 | 8/2003 | Lemelson et al. |
| 6,744,927 | B1 | 6/2004 | Kato |
| 6,753,900 | B2 | 6/2004 | Runcie et al. |
| 6,801,642 | B2 | 10/2004 | Gorday et al. |
| 6,812,956 | B2 | 11/2004 | Ferren et al. |
| 6,878,924 | B2 | 4/2005 | Baron |
| 7,023,464 | B1* | 4/2006 | Harada et al. ............ 348/14.01 |
| 7,091,928 | B2 | 8/2006 | Rajasingham |
| 7,262,788 | B2 | 8/2007 | Ono et al. |
| 7,269,292 | B2 | 9/2007 | Steinberg |
| 7,425,981 | B2 | 9/2008 | Kamariotis |
| 2002/0061131 | A1 | 5/2002 | Sawhney et al. |
| 2002/0113662 | A1 | 8/2002 | Rathore et al. |
| 2002/0113862 | A1 | 8/2002 | Center, Jr. et al. |
| 2004/0012613 | A1 | 1/2004 | Rast |
| 2004/0210844 | A1 | 10/2004 | Pettinati et al. |
| 2005/0210105 | A1 | 9/2005 | Hirata et al. |
| 2005/0248651 | A1 | 11/2005 | Hirata et al. |

FOREIGN PATENT DOCUMENTS

| | | |
|---|---|---|
| FR | 2529352 | 12/1983 |
| JP | 401221086 A | 9/1989 |
| JP | 404344788 A | 12/1992 |
| JP | 05219269 | 8/1993 |
| WO | WO 99/57900 | 11/1999 |

OTHER PUBLICATIONS

U.S. Appl. No. 11/025,493, Beck et al.

"FRANN: Face Recognition Using Artificial Neural Network" html version of the file http://www.ece.stevens-tech.edu/ds/archie/03F-04S/deliverables/grp19/Fall_Proposal.pdf, date submitted Oct. 14, 2003; 43 pages.

Soongsathitanon, Somphob, et al., University of Newcastle upon Tyne, "A New Orthogonal Logarithmic Search Algorithm for Fixed Block-Based Motion Estimation for Video Coding," date unknown, 4 pages.

Atienza et al.; "a Practical Zoom Camera Calibration Technique: An Application on Active Vision for Human-Robot Interaction "; Research School of Information Sciences and Engineering, The Australian National University, Canberra ACT 0200 Australia; (2001); 6 pages.

"Eyegaze Analysis System"; LC Technologies, Inc.; http://www.eyegaze.com/2Products/Development/Developmentmain.htm; 2003; 9 pages.

"Gaze Point Detection"; http://wwwsyseng.rsise.anu.edu.au/rsl/hrintact/gazepoint.html; Oct. 24, 1997; 2 pages.

Kawato et al.; "Detection and Tracking of Eyes for Gaze-camera Control"; ATR Media Information Science Laboratories; (2002); 6 pages.

Kim et al.; "Intelligent Process Control Via Gaze Detection Technology"; Aug. 3, 1999; 1 page.

Kurniawan et al.; "Design and User Evaluation of a Joystick-operated Full-screen Magnifier"; Conference on Human Factors in Computing Systems, Proceedings of the Conference on Human Factors in Computing Systems; 2003, 4 pages.

Magee et al.; "EyeKeys: A Real-Time Vision Interface Based on Gaze Detection from a Low-grade Video Camera"; IEEE; 2004; 8 pages.

Perez et al.; "A Precise Eye-Gaze Detection and Tracking System"; Departamento de Artiquitectura y Tecnologia de Sistemas Informáticos (Department of Architecture and Technology of Systems Information)(DATSI); Feb. 2003, 4 pages.

"Quick Glance 1"; Eye Tech Digital Systems; http:www.eyetechds.com/qglance1.htm; (date unknown); 2 pages.

U.S. Appl. No. 10/459,182, filed Jun. 10, 2003, Chan et al.

U.S. Appl. No. 10/949,781, filed Sep. 24, 2004, Lang et al.

U.S. Appl. No. 10/941,199, filed Sep. 14, 2004, Beck et al.

TheFreeDictionary.com website entitled, "Neural Network," Farlex Inc. (2004), available at http://encyclopedia.thefreedictionary.com/neural%20network, 6 pages.

TheFreeDictionary.com website entitled, "Feedforward," Farlex Inc. (2004), available at http://encyclopedia.thefreedictionary.com/feedforward, 3 pages.

TheFreeDictionary.com website entitled, "Sigmoid function," Farlex Inc. (2004), available at http://encyclopedia.thefreedictionary.com/sigmoid%function, 2 pages.

TheFreeDictionary.com website entitled, "Genetic algorithm," Farlex Inc. (2004), available at http://encyclopedia.thefreedictionary.com/genetic%20algorithm, 6 pages.

TheFreeDictionary.com website entitled, "Neuroevolution," Farlex Inc. (2004), available at http://encyclopedia.thefreedictionary.com/Neuroevolution, 2 pages.

TheFreeDictionary.com website entitled, "Pattern recognition," Farlex Inc. (2004), available at http://encyclopedia.thefreedictionary.com/Pattern%20recognition, 3 pages.

"Character and Image Recognition Technology," Sanyo Electric Co., Ltd., Technology R&D Headquarters (2003), available at http://www.sanyo.co.jp/R_and_D/english/theme/c-2.html, 2 pages.

"Image Recognition" Entropy Software Laboratory, (undated), available at http://www.entropysoftwarelab.com/technology/imageRecognition/html, 3 pages.

Brandstein, Michael, "Real-Time Face Tracking Using Audio and Image Data," Harvard Intelligent Multi-Media Environment Laboratory (HIMMEL) (undated), pp. 1-22.

Eisert, Peter, "Immersive 3-D Video Conferencing: Challenges, Concepts, and Implementations," Proc. SPIE Visual Communications and Image Processing (VCIP), Lagano, Switzerland (Jul. 2003), 11 pages.

Fintzel, Katia, et al., "Real Time 3D Navigation in a Static Virtualzied Scene from a Limited Set of 2D Data," IEEE Int'l Conf. on Multimedia & Expo 2000, New York, Electronic Proceedings, 11 pages.

Jun. Song F., et al., *Optical Feature Recognition*, (Mar. 6, 1995), 1 page.

Mark, William R., et al., "Post-Rendering 3D Warping", Proceedings of 1997 Symposium on Interactive 3D Graphics, Providence, RI, Apr. 27-30, 1997, pp. 7-16.

Peter Kauff Projects, "BS-Immersive Media & 3D Video Group," (Ed. Christoph Fehn, Nov. 12, 2002), 6 pages.

"Introduction to Optics and Lenses," The Imaging Source (2003), available at http://www.theimagingsource.com/prod/opt/opticsintro_2.htm, 10 pages.

"Image Gallery," CDMOptics (2001), 2 pages.

"Cisco VT Advantage Video Telephony Solution," Cisco Systems, Inc. (1992-2004), pp. 1-6.

"Essential Optics for Digiscoping," Digibird.com (2002), available at http://www.digibird.com/primerdir/primer0.htm, 4 pages.

"Facial Recognition Overview," Imagis Technologies Inc. (2004), available at http://www.imagistechnologies.com/Products/FaceRecognition/, 1 page.

Marple et al., "Video Compression Using Context-Based Adaptive Arithmetic Coding," Proc. IEEE International Conference on Image Processing (ICIP'01), vol. III, pp. 558-561, Oct. 2001.

Data Sheet entitled, "Motion Image Separation Technology," NetWatch® Mist® (undated), 2 pages.

"Motion Image Separation Technology," NetWatch® MIST (printed Feb. 9, 2005), available at http://www.ar-t.co.uk/mist_data.html, 2 pages.

"Machine Vision Technology," Neven Vision (2003-2004), available at http://www.nevenvision.com/technology, 10 pages.

"Nordic Guide to Video Telephony and Video Relay Service," The Nordic Forum for Telecommunication and Disability 2002, NFTH Mar. 2002, pp. 1-14.

News Release, "Imagis Technologies Releases Major Upgrade to Face Recognition Software," Imagis Technologies Inc. (Sep. 2002).

Press Release, "Mobile Identifier Facial Recognition System Successfully Deployed by LAPD to Improve Neighborhood Safety," Neven Vision Inc. (Feb. 7, 2005), 2 pages.

Press Release, "Toshiba Announces World's First Image Recognition LSI for Intelligent Vehicle System," Toshiba Corporation (Feb. 6, 2001), available at http://www.toshiba.co.jp/about/press/2001_02/pr0602.htm, 3 pages.

Oana G. Cula et al., "Recognition Methods for 3D Textured Surfaces," Proceedings of SPIE Conference on Human Vision and Electronic Imaging VI, San Jose (Jan. 2001), pp. 1-14.

Oshima, Shigeru, "Acquisition: Fundamental Optics of Television Camera Lenses," shortened version of the Fundamental Optics section in *Canon Guidebook of Television System Optics (Ed.2)*, (Jan. 2000), 13 pages.

Partek web site entitled, "Turning Data into Discovery," (2004), available at http://www.partek.com/, 1 page.

Soongsathitanon et al., "A New Orthogonal Logarithmic Search Algorithm for Fixed Block-Based Motion Estimation for Video Coding," date unknown.

"Software and Hardware for Data Analysis Pattern Recognition and Image Processing," *The Pattern Recognition Files*, maintained by Ela Pekalska (Jan. 24, 2004), available at http://www.ph.tn/tudelft.nl/PRInfo/software.html, 5 pages.

Techno World, "Multimedia Cameras for Visual Society: Ultraminiature Multimedia Camera Systems," (undated), 6 pages.

Wolberg, George, "Digital Image Warping," IEEE Computer Society Press Monograph (Mar. 4, 2002), available at http://www-cs.ccny.cuny.edu/~wolberg/diw.html, 7 pages.

"Blind Source Separation of recorded speech and music signals", available at http://www.cnl.salk.edu/~tewon/Blind/blind_audio.html, printed Dec. 29, 2004.

"Nokia 6100 Cellular Phones", available at http://www.mediaplace.nl/nokia-6100-cellular-pho . . . , website updated Dec. 9, 2004, pp. 1-4.

"Student Voicemail Information", University of Saint Francis, available at http://www.sf.edu/computing/voicemail.shtml, website updated Feb. 10, 2005, pp. 1-3.

Kawato et al., Image and Vision Computing, "Detection and Tracking of Eyes for Gaze-camera Control," 22(12):1031-1038, Mar. 2004.

LMS, Blind Source Separation, 4 pages at http://www.Int.de/LMS/research/projects/BSS/index.php?lang=eng, printed Dec. 29, 2004.

Rickard, "Blind Source Separation", available at http://eleceng.ucd.ie/~srickard/bss.html, last modified Jul. 2, 2004, pp. 1-3.

TheFreeDictionary.com website entitled, "Image analysis," Farlex Inc., printed Jul. 7, 2008, available at http://encyclopedia.thefreedictionary.com/image%20analysis, pp. 1-3.

Background for the above-captioned application (previously provided).

* cited by examiner

PREVENT VIDEO CALLS BASED ON APPEARANCE

CROSS REFERENCE TO RELATED APPLICATION

Cross reference is made to U.S. patent application Ser. Nos. 10/949,781, filed Sep. 24, 2004, entitled "CAMERA FRAME DISPLAY", and 10/941,199, filed Sep. 14, 2004, entitled "CUSTOMIZABLE BACKGROUND FOR VIDEO COMMUNICATIONS", each of which is incorporated herein by this reference.

FIELD OF THE INVENTION

The invention relates generally to an image acquisition system and particularly to an image acquisition that is user customizable to provide a selected video display to another participant to a video telecommunication.

BACKGROUND

The use of video telephony, which allows remote parties to both see and hear one another, is becoming increasingly popular. As used herein, "video telephony" refers to visual communication using both video and audio transmitted over a communications network. It includes both mobile and stationary video telephony. Typically, video telephony refers to packet-switched and circuit-switched, wireless and wired, audio and video communications, such as Voice Over IP or VoIP communications, and video teleconferencing. Such applications facilitate remote communication by providing a visual image of each conference participant. Accordingly, video conferencing allows parties to communicate audibly and visibly, without requiring lengthy and expensive travel.

In a typical video telecommunications application, a camera is positioned to obtain an image of each of the participants. The image of one participant is then provided to the other participant so that each participant is viewing the other participant during the communication session. The video telecommunications interaction can include two or more participants, each viewing an image of the other participant(s).

When conducting a video conference or point-to-point video call, a participant may desire to monitor the video displayed to the other participants for privacy and other reasons. For example, the participant may not want to participate in a video call or have video enabled if his or her appearance is not acceptable to himself and/or the other party. In a business setting, a participant may not want the other party to see that his attire is business casual (i.e. without a tie). A participant may not want the other party to see his or her facial appearance when it is not presentable. A participant may not want to participate in a video call when the video quality will be poor.

There are a variety of features in current video telecommunications applications for addressing some, but not all, of these issues. For example, a sending participant may mute the transmission of his or her image information so that the other party's video monitor is a blank screen. The other party will receive an indication that the sending participant has muted his or her image information. While muting does provide a degree of privacy, it can be easy for a party to forget to mute the video in any of the situations set forth above, particularly given the unexpected and unpredictable nature of telephone calls. As set forth in copending U.S. application Ser. No. 10/941,199, filed Sep. 14, 2004, entitled "CUSTOMIZABLE BACKGROUND FOR VIDEO COMMUNICATIONS", a party can alter his or her background before the video stream is transmitted to the other party. However, the participant may only want to alter his or her background for specific callers/callees and not for everyone or alter his or her background in different ways for different callers/callees.

SUMMARY

These and other needs are addressed by the various embodiments and configurations of the present invention. The present invention is directed generally to monitoring whether or not a video stream to be transmitted to another participant is acceptable.

In one embodiment of the present invention, a video teleconferencing method is provided that includes the steps of:

(a) receiving a video stream including one or more image frames depicting a first participant of a video call with a second participant;

(b) determining whether the image frame(s) is/are appropriate for the second participant; and (c) when the image frame(s) is not appropriate for the video call, performing one or more of the following:

(c1) altering the image frame(s) to be appropriate for the second participant;

(c2) before transmission of the image frame(s) to the second participant, notifying the first participant that the image frame(s) is not appropriate;

(c3) automatically refocusing a camera receiving an image of the first participant so that the image frame(s) becomes appropriate for the second participant; and (c4) blocking transmission of the image frame(s) to the second participant.

In one configuration, the teleconferencing system includes:

a motion detector that detects a portion of the image frame(s) that is in motion;

a head locator that locates a head of the first participant in the portion of the image frame(s);

a face recognizer that compares the located head to a plurality of references faces to identify the first participant; and a video communication controller that, for the identified recipient and electronic address of the second participant, retrieves a set of rules defining what image information in the image frame(s) is appropriate for display to the second participant.

By way of example, the video teleconferencing system can:

(a) identify a facial feature of the first participant and determine whether the identified facial feature is undesirable for the second participant;

(b) identify a movement of a body part of the first participant and determine whether the identified movement is undesirable for the second participant;

(c) identify a degree of clothing and/or an item of clothing worn by the body of the first participant and determine whether the degree of clothing and/or an item of clothing is undesirable for the second participant; and/or (d) identify an object in the background portion of the image frame(s) and determine whether the identified object is undesirable for the second participant.

The video teleconferencing system can solve the problem of accidental video transmission when the person in front of the camera does not have his/her normal appearance or the captured video stream is otherwise inappropriate for transmission to the other participant. The system is automated and is not commonly prone to human error. The system can be trained once with which video information is deemed to be fit or acceptable for transmission and/or can learn automatically based on past video calls made by the first participant. For example, before a video call is made the system can compare the current appearance of the first participant with a stored "appropriate" appearance for the first participant. When it detects a predetermined or substantial difference (e.g., a T-shirt instead of suit or the absence of a tie), it can warn the first participant and prevent the video call or alternatively display an avatar or some other image in place of the actual video stream (or camera feed).

These and other advantages will be apparent from the disclosure of the invention(s) contained herein.

As used herein, "at least one . . . and" is an open-ended expression that is both conjunctive and disjunctive. For example, the expression "at least one of A, B and C" means A alone, B alone, C alone, A and B together, A and C together, B and C together, and A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
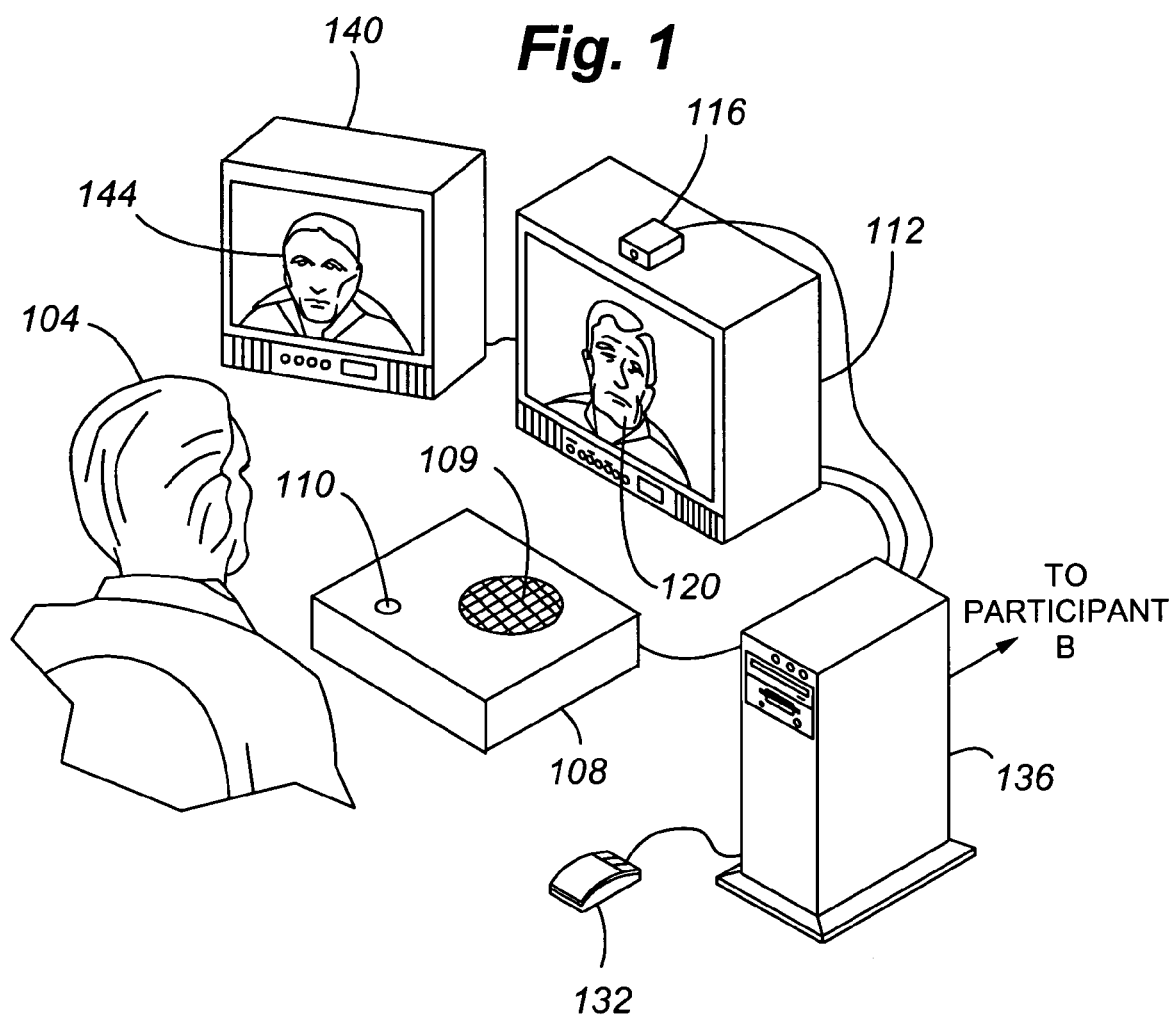
FIG. 1 depicts a video telecommunications system according to an embodiment of the present invention.

With reference to FIG. 1, components of a video telecommunications system 100 in accordance with an embodiment of the present invention are illustrated. In general, the video telecommunications system 100 comprises a first participant 104, an audio transceiver 108, which includes a speaker 109 and a microphone 110, first and second video displays 112 and 140, and a camera 116. The video telecommunications system 100 allows the first participant 104 to communicate both audibly and visibly with a second participant at a remote location. In FIG. 1, an image 120 of the second participant is shown in the display 112 and the image 144 of the first participant 104 is shown in the display 140.

The camera 116 acquires the image information of the first participant 104. In one configuration, the camera is connected to a Universal Serial Bus (USB) of the Personal Computer or PC 136 running the Microsoft Windows 2000 ™ operating system. Standard Windows Driver Model methods are used to bring individual frames of the video sequence into a storage area in Random Access Memory or RAM. The camera driver is configured to deliver the image in YUV format. In YUV format, each pixel of the image information is represented by three 8-bit numbers called channels. The color information is contained in the U and V channels and the intensity (black and white) information is contained in the Y channel.

In general, the video telecommunications system 100 of the present invention provides the ability to identify objects in and/or characteristics of a video stream, prior to transmission to the other endpoint, compare the identified objects/characteristics with predetermined objects/characteristics identified as being desirable/undesirable, and, when selected objects and/or characteristics are present in or absent from the video stream (depending on whether they are desirable or undesirable), take appropriate actions, including warning of the first participant before or during the call, blocking and/or altering the outgoing video stream, and displaying an avatar or another image (such as a still image or photograph of the first participant) in lieu of the video stream. The first participant can, of course, override the mandated action and permit the unaltered video stream to be provided to the second participant. A user selection input device 132 associated with the PC 136 can be used by the first participant in designating the objects and/or characteristics the presence or absence of which trigger appropriate actions. By way of illustration, the object (e.g., a tie) may be pointed to with a mouse cursor and the mouse clicked to identify the object. The mouse may be clicked and, while clicked, the mouse cursor dragged along the outline of the object. As will be appreciated, other image identification techniques may be employed depending on the type of input device 132 employed. The device 132 is not limited to a mouse but can be any type of input device, such as a stylus, a finger with a touch screen, a keypad, a track ball, a voice recognition system operating in connection with the microphone 110, and the like. Alternatively, the identification may be done automatically by an expert system.

Figure 2:
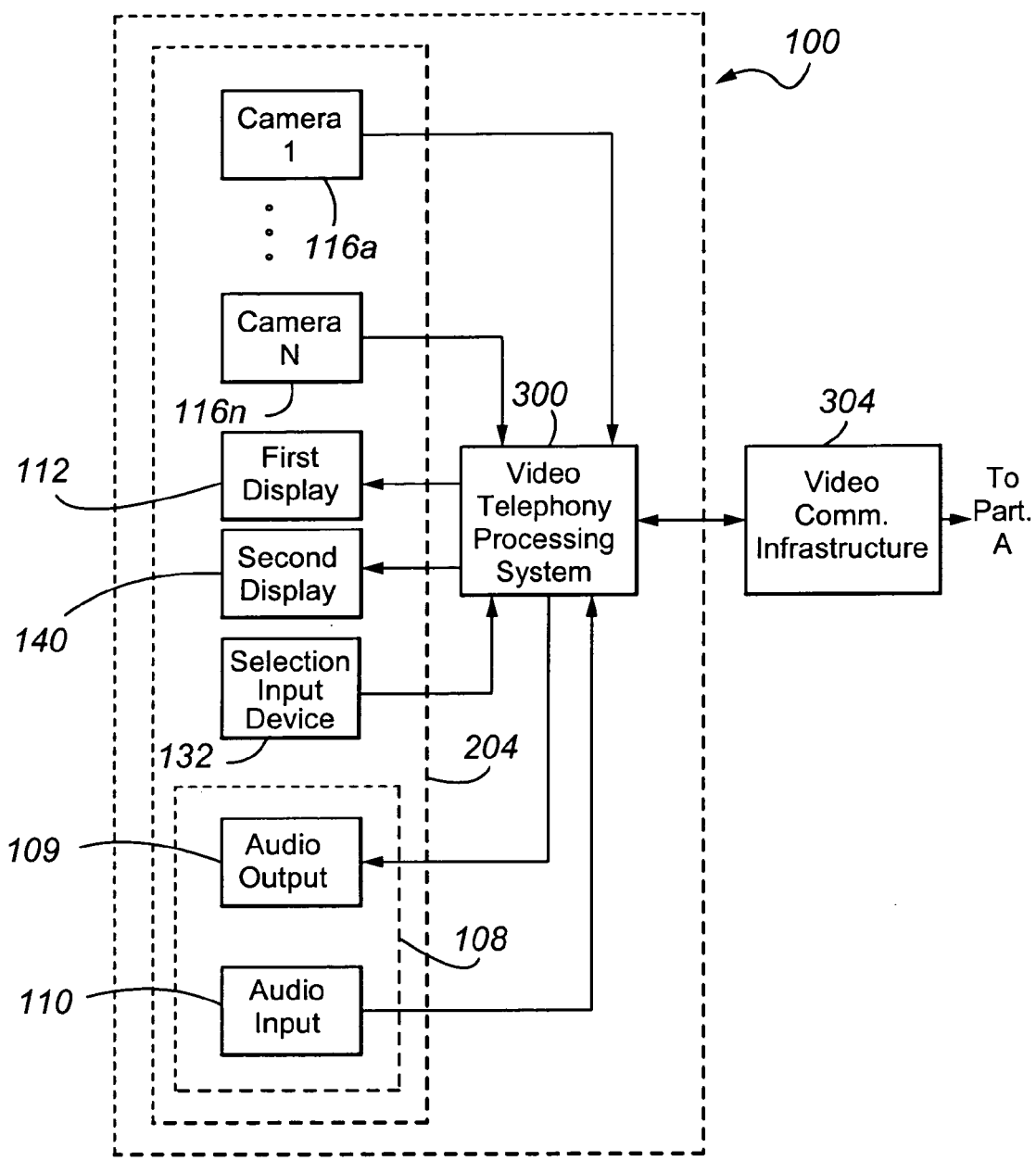
FIG. 2 is a block diagram depicting a video telecommunications system according to an embodiment of the present invention.

With reference now to FIG. 2, a video telecommunications system 100 in accordance with an embodiment of the present invention is depicted in block diagram form. As noted above, the video telecommunications system 100 generally functions in connection with at least first and second participants. As shown in FIG. 2, a video telecommunications system 100 in accordance with the present invention generally includes an audio transceiver 108, and the included speaker 109 and microphone 110, first and second displays 112 and 140, first through nth cameras 116a-n, the user selection input device 132, and the PC 136 including a video telephony processing system 300. In general, the devices for interfacing with the first participant 104, such as the audio transceiver 108, the first and second displays 112 and 140, the camera(s) 116a-n, and the user selection input device 132 are located in the proximity of the first participant (i.e. or at a first video location as shown in FIG. 1). As shown in FIG. 2, the first video location is not limited to a single camera but may include additional cameras, such as cameras 116a-n, to produce desired visual effects, such as a 3D image. In one configuration, a wide angle center camera is used to cover the entire field of view of the system and to permit the location of each face in the field of view. Left and right cameras, positioned on either side of the center camera and having narrower fields of view provide higher quality images of objects further from the system. The first video location may additionally include the PC 136. Alternatively, the PC 136 may be sited at a different location. Furthermore, functions of the PC 136 may be distributed among various locations interconnected to the video telecommunications image acquisition system 100.

The audio transceiver 108 provides audio output through a speaker 109 and audio input through a microphone 110. In accordance with an embodiment of the present invention, the audio transceiver 108 comprises a speaker phone having common telephony functionality. According to another embodiment of the present invention, the audio transceiver 108 comprises a speaker 109 and a microphone 110 that function as part of a soft phone running on a processor 136 comprising a general purpose or personal computer. In general, the audio transceiver 108 may be any device capable of translating acoustical signals into electrical signals and vice versa.

The displays 112 and 140 may comprise any device capable of receiving a video signal and displaying a corresponding image. Accordingly, the display 112 may comprise a cathode ray tube, or a liquid crystal display.

The cameras 116a-n may be any device capable of translating images of a scene into electronic signals. For example, the camera 116 may comprise an optical lens system in combination with an image sensor, such as a charge coupled device or Complementary Metal Oxide Semiconductor or CMOS.

The PC 136 may be a general purpose computer. As will be appreciated, it may be any other type of computer, such as a laptop. The PC 136 may comprise a specially adapted video telecommunications processor unit, for example, utilizing a specialized controller, or a general purpose processor running code specifically adapted for performing video telecommunications functions. For example, the processor 136 may comprise a personal computer running a video telecommunications software application in conjunction with a standard operating system, such as the Windows 2000™ operating system. As a further example, the PC may be replaced with a video telephone incorporating a suitably programmed controller running firmware.

After processing or transforming the image obtained by the camera(s) 116, the video telecommunications system 100 may provide the transformed image to a video communications infrastructure 304. The video communications infrastructure 304 may comprise an encoder/decoder, one or more outputs from the video telecommunications system 100, and an external communication network interconnecting the video telecommunications system 100 to a second video telecommunications system of the second participant, or to any other video telecommunications station or device capable of displaying images for viewing by a second participant. The encoder/decoder preferably uses the MPEG-7 multimedia standard. The MPEG-7 standard allows the encoding of arbitrarily shaped video objects and provides auxiliary alpha planes to transmit additional pixel information associated to the color data. In accordance with an embodiment of the present invention, the second participant 120 may view the images provided by the video telecommunications system on a conventional video phone, or a soft video phone implemented in connection with a PC. In accordance with a further embodiment of the present invention, the video communications infrastructure 304 comprises the Internet, and utilizes Internet protocol type communications, such as the H.323 and/or Session Initiation Protocol (SIP) protocols. In addition, the video communications infrastructure 304 may comprise protocols, such as RTP, for the transfer of audio and video information between the video telecommunications system 100 used by the first participant 104 and that used by the second participant 120.

Figure 3:
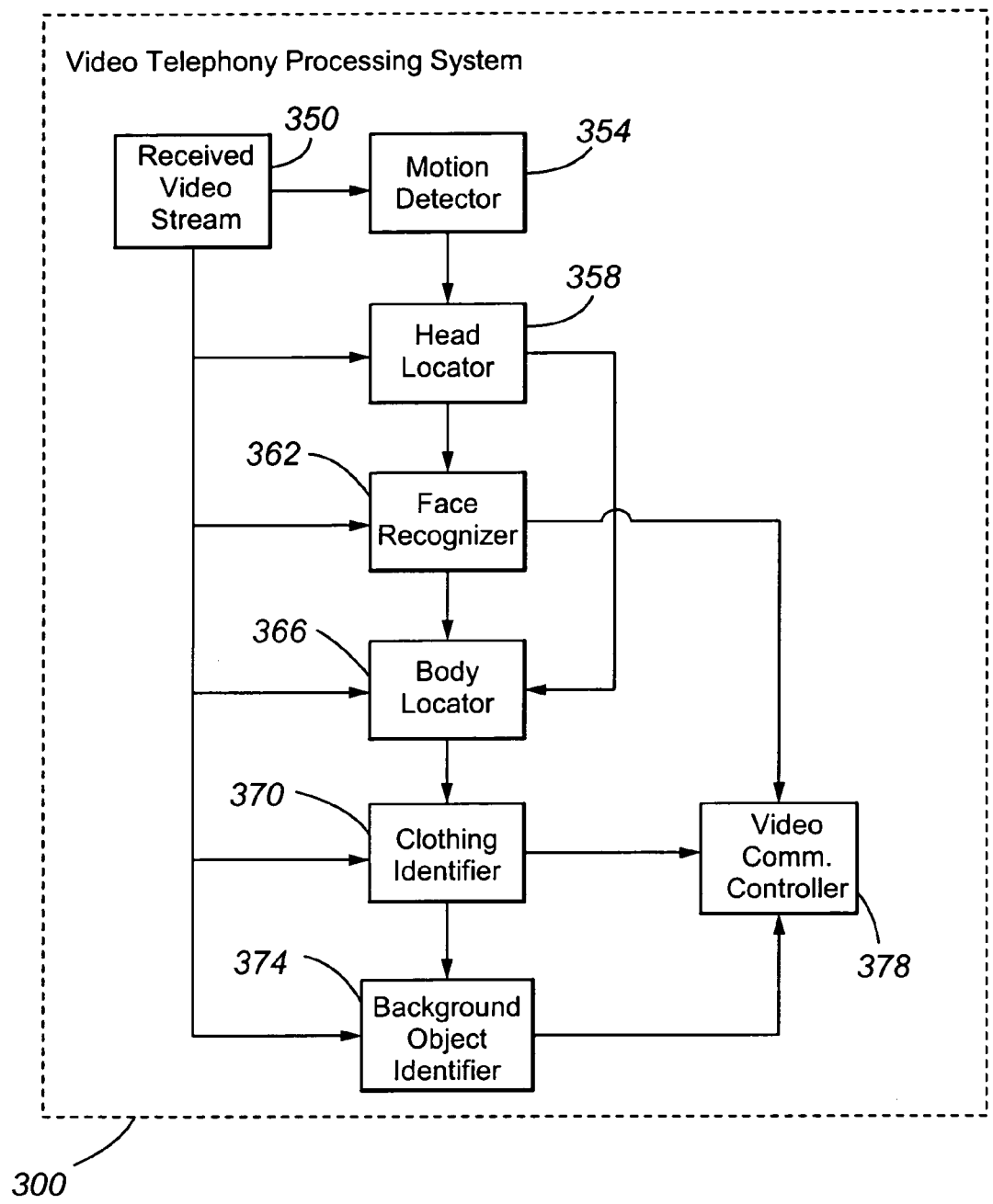
FIG. 3 is a block diagram depicting a video telephony processing system according to an embodiment of the present invention.

Referring now to FIG. 3, the video telephony processing system 300 is depicted in greater detail as a software-controlled system (though the system may be implemented in firmware, such as by a logic circuit, e.g., an Application Specific Integrated Circuit or ASIC). Included in memory are a motion detector 354, head locator 358, face recognizer 362, body (part) locator 366, clothing identifier 370, and background object identifier 374.

Motion detector 354 processes the sequence of image frames in the received video stream 350 to identify regions of the recorded scene that contain motion. This is commonly accomplished by comparing successive frames of the image sequence to find those locations containing image data that change over time. Since the image background (i.e., images of the furniture and other objects in the room) will usually remain unchanged from frame to frame, the areas of movement will generally be evidence of the presence of a person in the scene.

When movement is identified, the head locator 358 selects a block of the image frame containing the movement and sends it to the face recognizer 362 where it is analyzed for the presence of recognizable faces. Face recognizer 362 determines whether the image data within the selected block resembles a face and, if so, whether the face is one of a reference set of faces. The reference set may include, for example, the images of the faces of all members of a family in whose house the video telecommunications system is deployed. The face recognizer 362 may further identify the participant's facial expression and an associated mood expression (e.g., smile, angry, sleepy, and the like) relative to a set of predefined facial expressions and associated moods and/or gaze direction (or pupil position). In one configuration, the operations of the motion detector 354, head locator 358, and face recognizer 362 are discussed in U.S. Pat. No. 5,164,992, which is incorporated herein by this reference. Other types of computer vision modules may be used for these components, including the visual sensing technology of Neven Vision, Inc., and/or of U.S. Published Patent Application 20020113862 filed Aug. 22, 2002 (which is incorporated herein by reference), a Software Development Kits by Imagis Technologies, Inc., Motion Image Separation Technology™ or MIS™ by Netwatch, and the like.

Using head location information from the head locator 358 and the block of the image frame provided to the head locator 358 by the motion detector 354, the body locator 366 identifies the image data in the selected image frame corresponding to the body of the first participant. In one configuration, the body locator 366 assumes that everything in the block of the image frame that does not describe or define the head describes or defines the participant's body (i.e., torso, arms, and legs). The body parts may be individually identified by suitable computer vision techniques. For example, hand gestures/positions may be recognized relative to a number of predefined hand gestures. Examples of computer vision modules suitable for the body locator 366 include the visual sensing technology of Neven Vision, Inc.

Using a block of the image frame selected by the body locator as representing the participant's body, the clothing identifier 370, uses a combination of color comparison to identify unclothed skin and pattern matching to identify items of clothing. To identify skin, the identifier 370 identifies the color information associated with image data at a selected location on the face identified by the face recognizer 362, assumes that it represents skin tone, and identifies the image data in the selected block having color information substantially similar to the facial skin tone. In this manner, the clothing identifier 370 can determine a percentage of and/or specific parts of the body that are unclothed. The clothing items can be identified by any suitable pattern matching technique.

Two methods are commonly used to recognize patterns, namely template matching and feature extraction. In template matching, a reference pattern, such as that selected by the first participant in desired or undesired image information, is stored for each response. Each input image is then compared with each reference pattern until a match is found. In feature extraction, rather than matching an entire image, as in template matching, a small set of features is extracted from the acquired image information and compared to a reference set of features in the desired or undesired image information.

Examples of pattern matching computational modules are the pattern matching software of Partek Incorporated and/or pattern matching techniques outlined in Cula, et al., "Recognition Methods for 3D Textured Surfaces", Proceedings of SPIE Conference on Human Vision and Electronic Imaging VI, San Jose, January 2001, which is incorporated herein by this reference.

Using the block of the image frame containing the head and body, the background object identifier 374 assumes that all other nonmoving image data in the selected frame is associated with the background. The object identifier 374 can use any suitable technique to identify objects in the background. Examples of suitable techniques include the pattern matching techniques discussed above.

Any of the modules discussed above may be implemented by one or more of a neural network, statistical shape analysis, Markov learning, source motion, Bayesian network, and color statistics. As will be appreciated, neural networks are particularly suited for the present invention as they have the ability to learn to recognize objects. A neural network is a mathematical or computational model for information processing based on a connectionist approach to computation. Common types of neural networks are feed forward and recurrent neural networks. Neural networks can obviate the need for the first participant to configure unacceptable rule templates for a specified second participant. A neural network can, each time the second participant's electronic address is a party to a call, determine what the first participant is wearing and use that template as what is acceptable attire for the second participant.

The video communication controller 378, inter alia, receives tags or other types of identifiers from the face recognizer, clothing identifier, and/or background identifier indicating the presence or absence of various objects in the video stream. The tags may represent, for example, a degree to which the participant is clothed (e.g., unclothed, fully clothed, wearing short-sleeved shirt, wearing long-sleeved shirt, wearing shorts, wearing pants, wearing a hat, and the like), whether or not the participant is wearing a tie, a facial expression and associated mood, the participant's current activity (e.g., eating), a particular hand gesture, an absence of an object from the background, the presence of an object in the background, an inappropriate person as the first participant (e.g., a person outside of a selected set of people), and the like. In another configuration, the tag simply represents the presence of a rule violation. In other words, the various modules, namely face recognizer 362, clothing identifier 370, and background object identifier 374, use an acceptable or unacceptable template specified by the first participant for the other participant's electronic address (e.g., telephone number, Internet address, etc.), compare it to the selected frame of the received video stream, and indicate with a tag whether or not a rule violation exists for the electronic address of the other participant. In one configuration, a rule violation exists if the comparison step identifies a difference between the selected frame and template that exceeds a selected threshold. Additionally, the video communications controller may receive or itself determine the quality of the image produced in the received video stream and whether or not it is acceptable using predefined thresholds for the factors influencing the video quality. As will be appreciated, video quality is typically a function of lighting, lens settings or characteristics, position of the first participant relative to the camera's field of view, captured image frame, image size, and/or image circle, and the like. When a rule violation exists, the video communications controller 378 institutes an action mandated by the first participant to be performed for that type of rule violation.

The operation of the video telephony processing system 300 will now be discussed with reference to FIG. 4.

In step 400, the system 300 receives a sequence of frames of the video stream 400. Typically, the system performs the steps of FIG. 4 for a set of frames rather than on a frame-by-frame basis.

In step 404, the system 300 performs head and body identification and tracking and, in step 408, face recognition and participant identification. Identification of the first participant permits the system 300 to determine the appropriate set of templates and rules to be applied. As noted, a plurality of users may use a single video telephony processing system 300 and have corresponding differently configured sets of templates and rules.

In step 408, the system 300 determines whether the first participant has configured rules restricting video for the present contact. This is done by mapping the identity of the first participant and the electronic address of the second participant against a set of rules. If no rules apply, the system 300 may return to step 400 as shown or terminate the performance of the steps of FIG. 4 for the duration of the contact. If rules apply, the rules are retrieved in step 416.

The processing performed by the system 300 can depend on the type of rules retrieved. There are five types of rules, namely rules regarding hand gestures, facial appearance, clothing, background, and video quality. The rules may apply before and/or during the contact.

When hand gesture rules apply, the system 300 identifies and tracks the first participant's hand gestures in step 424.

When facial appearance rules apply, the system 300 identifies and tracks the first participant's facial appearance/expressions in step 428.

When clothing rules apply, the system 300 identifies and tracks selected articles of clothing in the first participant's attire in step 432.

When background rules apply, the system 300 identifies and tracks selected objects in the first participant's background in step 436.

When video quality rules apply, the system 300 evaluates video quality in step 440.

In step 444, the system 300 compares the identified tags with applicable rules.

In decision diamond 448, the system 300 determines whether a rule has been violated. If not, the system 400 terminates operation or returns to step 400. If so, the system 300 proceeds to step 452.

In step 452, the system 300 determines a mandated action to be performed. If the rule violation occurs before or during a call is answered, a visual warning may be provided on the first participant's graphical user interface and/or an audio warning over the first participant's speakers. The warning may remind the user of the rule violation so that the user can elect not to answer the call or, if answered, to present no video image (or mute the image) or present an avatar or different image of the first participant to the other participant. Alternatively, the received video stream 400 may be altered using well-known image processing techniques. For example, the first participant's clothing may be replaced by and/or the bare body parts of the first participant masked by a clothing template to give the appearance to the second participant that the first participant is fully and properly clothed. If the first participant's background constitutes a rule violation, the background may be replaced by a background template as discussed in copending U.S. patent application Ser. No. 10/941, 199, filed Sep. 14, 2004. Alternatively, the cameras may be refocused so as to eliminate the object causing the rule violation. For example, if I am inappropriately attired or my background is inappropriate the cameras may be refocused so that an enlarged image of my face is provided to the second participant.

Figure 4:
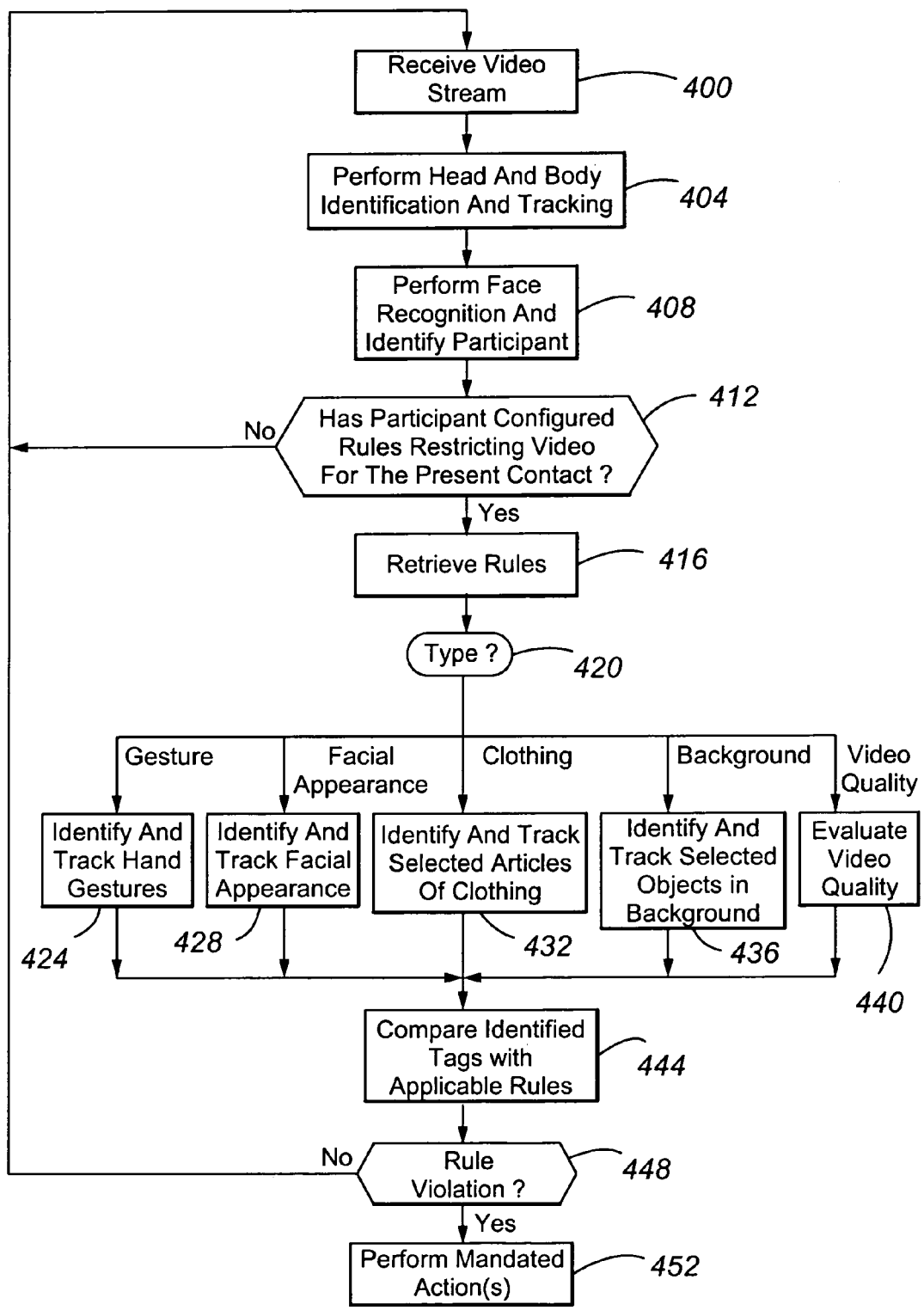
FIG. 4 is a flow chart of the operation of the video telephony processing system according to an embodiment of the present invention.

After the mandated action is performed, the system 300 returns to step 400 as shown or terminates operation of the steps of FIG. 4.

A number of variations and modifications of the invention can be used. It would be possible to provide for some features of the invention without providing others.

By way of example, the video telephony processing system 300 may be used with a video conferencing system including more than two participants.

In another alternative embodiment, items of clothing include Radio Frequency Identification or RFID tags and a tag reader, in communication with the video telephony processing system 300, reads the tags. If specified tags are or are not present, a rule violation can be triggered. For example, a tie or suit has a corresponding RFID tag. If the tag is not sensed by the tag reader and the second participant requires formal attire, a rule violation is triggered. Alternatively, an undesired article of clothing for the second participant (e.g., a hat) is worn by the first participant. When the RFID tag on the hat is sensed by the tag reader, a rule violation is triggered.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A video teleconferencing method, comprising:
   (a) receiving a video stream comprising at least one image frame depicting a first participant of a video call, the video call being between at least the first participant and a second participant;
   (b) determining, by a computer and based on the at least one image frame, whether the at least one image frame is acceptable for the second participant to the video call; and
   (c) when the at least one image frame is not acceptable for the video call, performing, by the computer, at least one of the following substeps:
      (c1) altering the at least one image frame to be appropriate for the second participant;
      (c2) before transmission of the at least one image frame to the second participant, notifying the first participant that the at least one image frame is not appropriate;
      (c3) automatically refocusing at least one camera receiving an image of the first participant so that the at least one image frame becomes appropriate for the second participant; and
      (c4) blocking transmission of the at least one image frame to the second participant.

2. The video teleconferencing method of claim 1, wherein the determining step (b) comprises the substeps of:
   (b1) detecting a portion of the at least one image frame that is in motion;
   (b2) locating a head of the first participant in the portion of the at least one image frame;
   (b3) comparing the located head to a plurality of references faces to identify the first participant; and
   (b4) for the identified recipient and electronic address of the second participant, retrieving a set of rules defining what is image information in the at least one image frame is appropriate for display to the second participant.

3. The video teleconferencing method of claim 1, wherein the determining step (b) comprises the substeps of:
   (b1) detecting a portion of the at least one image frame that is in motion;
   (b2) locating a head of the first participant in the portion of the at least one image frame;
   (b3) identifying a facial feature of the first participant; and
   (b4) determining whether the identified facial feature is undesirable for the second participant.

4. The video teleconferencing method of claim 1, wherein the determining step (b) comprises the substeps of:
   (b1) detecting a portion of the at least one image frame that is in motion;
   (b2) locating a body part of the first participant in the portion of the at least one image frame;
   (b3) identifying a movement of the body part; and
   (b4) determining whether the identified movement is undesirable for the second participant.

5. The video teleconferencing method of claim 1, wherein the determining step (b) comprises the substeps of:
   (b1) locating a body of the first participant in a portion of the at least one image frame;
   (b3) identifying at least one of a degree of clothing and an item of clothing worn by the body of the first participant; and
   (b4) determining whether the at least one of a degree of clothing and an item of clothing is undesirable for the second participant.

6. The method of claim 5, wherein the determining step (b3) comprises the sub-steps:
   determining a skin color of the first participant's body;
   using the skin color to unclothed skin to determine unclothed areas of the first participant's body;
   using pattern matching to identify the item of clothing; and
   based on the unclothed and clothed areas of the first participant's body, determining the degree of clothing of the first participant.

7. The video teleconferencing method of claim 1, wherein the determining step (b) comprises the substeps of:
   (b1) locating a background portion of the at least one image frame;
   (b3) identifying at least one object in the background portion; and
   (b4) determining whether the identified object is undesirable for the second participant.

8. The video teleconferencing method of claim 1, wherein substep (c1) is performed and wherein the first participant's face is not altered.

9. The video teleconferencing method of claim 1, wherein substep (c2) is performed.

10. The video teleconferencing method of claim 1, wherein substep (c3) is performed and wherein the first participant's face, though refocused is not altered.

11. The video teleconferencing method of claim 10, wherein the at least one camera is automatically refocused to remove undesirable information from the at least one image frame.

12. The video teleconferencing method of claim 1, wherein substep (c4) is performed.

13. A computer readable medium comprising computer executable instructions that, when executed, perform the steps of claim 1.

14. A video teleconferencing system, comprising:
   (a) an input operable to receive a video stream comprising at least one image frame depicting a first participant of a video call, the video call being between at least the first participant and a second participant;
   (b) a video telephony processing system operable, by computer, to (i) determine, based upon information in the at least one image frame, whether the at least one image frame is appropriate and (ii), when the at least one image frame is not appropriate for the video call, perform at least one of the following suboperations:
      (b1) alter the at least one image frame to be appropriate for the second participant;
      (b2) before transmission of the at least one image frame to the second participant, notify the first participant that the at least one image frame is not appropriate;
      (b3) automatically refocus at least one camera receiving an image of the first participant so that the at least one image frame becomes appropriate for the second participant; and
      (b4) block transmission of the at least one image frame to the second participant.

15. The video teleconferencing system of claim 14, wherein the determining operation comprises the suboperations of:
   (b5) detect a portion of the at least one image frame that is in motion;
   (b6) locate a head of the first participant in the portion of the at least one image frame;
   (b7) compare the located head to a plurality of references faces to identify the first participant; and
   (b8) for the identified recipient and electronic address of the second participant, retrieve a set of rules defining what is image information in the at least one image frame is appropriate for display to the second participant.

16. The video teleconferencing system of claim 14, wherein the determining operation comprises the suboperations of:
   (b5) detect a portion of the at least one image frame that is in motion;
   (b6) locate a head of the first participant in the portion of the at least one image frame;
   (b7) identify a facial feature of the first participant; and
   (b8) determine whether the identified facial feature is undesirable for the second participant.

17. The video teleconferencing system of claim 14, wherein the determining operation comprises the suboperations of:
   (b5) detect a portion of the at least one image frame that is in motion;
   (b6) locate a body part of the first participant in the portion of the at least one image frame;
   (b7) identify a movement of the body part; and
   (b8) determine whether the identified movement is undesirable for the second participant.

18. The video teleconferencing system of claim 14, wherein the determining operation comprises the suboperation of:
   (b5) locate a body of the first participant in a portion of the at least one image frame;
   (b6) identify at least one of a degree of clothing and an item of clothing worn by the body of the first participant; and
   (b7) determine whether the at least one of a degree of clothing and an item of clothing is undesirable for the second participant.

19. The video teleconferencing system of claim 14, wherein the determining step (b) comprises the suboperations of:
   (b5) locate a background portion of the at least one image frame;
   (b6) identify at least one object in the background portion; and
   (b7) determine whether the identified object is undesirable for the second participant.

20. The video teleconferencing system of claim 14, wherein suboperation (b1) is performed and wherein the first participant's face is not altered.

21. The video teleconferencing system of claim 14, wherein suboperation (b2) is performed.

22. The video teleconferencing system of claim 14, wherein suboperation (b3) is performed and wherein the first participant's face, though refocused, is not altered.

23. The video teleconferencing method of claim 14, wherein the at least one camera is automatically refocused to remove undesirable information from the at least one image frame.

24. The video conferencing system of claim 14, wherein suboperation (b4) is performed.

25. A video teleconferencing system, comprising:
   (a) an input to receive a video stream comprising at least one image frame depicting a first participant of a video call, the video call being between at least the first participant and a second participant;
   (b) a video telephony processing system including:
      (B1) a motion detector operable to process the at least one image frame and identify at least one region of the at least one image frame containing motion;

(B2) a head locator operable to select a block of the at least one image frame containing motion and determine whether the selected block comprises a face of the first participant;

(B3) a body locator operable to identify image data in the at least one image frame comprising at least one body part of the first participant other than the face of the first participant;

(B4) a clothing identifier operable to determine at least one of a degree of clothing of the first participant's body and an item of clothing worn by the first participant; and (B5) a video communication controller operable to (i) receive a set of tags from at least one of the head locator, body locator, and clothing identifier, (ii) determine whether the at least one image frame is appropriate for the video call, and (iii), when the at least one image frame is not appropriate for the video call, perform at least one of the following subfunctions:

(B5.1) alter the at least one image frame to be appropriate for the second participant;

(B5.2) before transmission of the at least one image frame to the second participant, notify the first participant that the at least one image frame is not appropriate;

(B5.3) automatically refocus at least one camera receiving an image of the first participant so that the at least one image frame becomes appropriate for the second participant; and (B5.4) block transmission of the at least one image frame to the second participant.

26. The video teleconferencing system of claim 25, wherein subfunction (B5.1) is performed and wherein the first participant's face is not altered.

27. The video teleconferencing system of claim 25, wherein subfunction (B5.2) is performed.

28. The video teleconferencing system of claim 25, wherein subfunction (B5.3) is performed and wherein the first participant's face, though refocused, is not altered.

29. The video teleconferencing system of claim 25, wherein subfunction (B5.4) is performed.

* * * * *